Dec. 15, 1942. A. L. PARKER ET AL 2,304,844
FUEL CUT-OFF VALVE AND OPERATING MECHANISM THEREFOR
Filed March 31, 1941
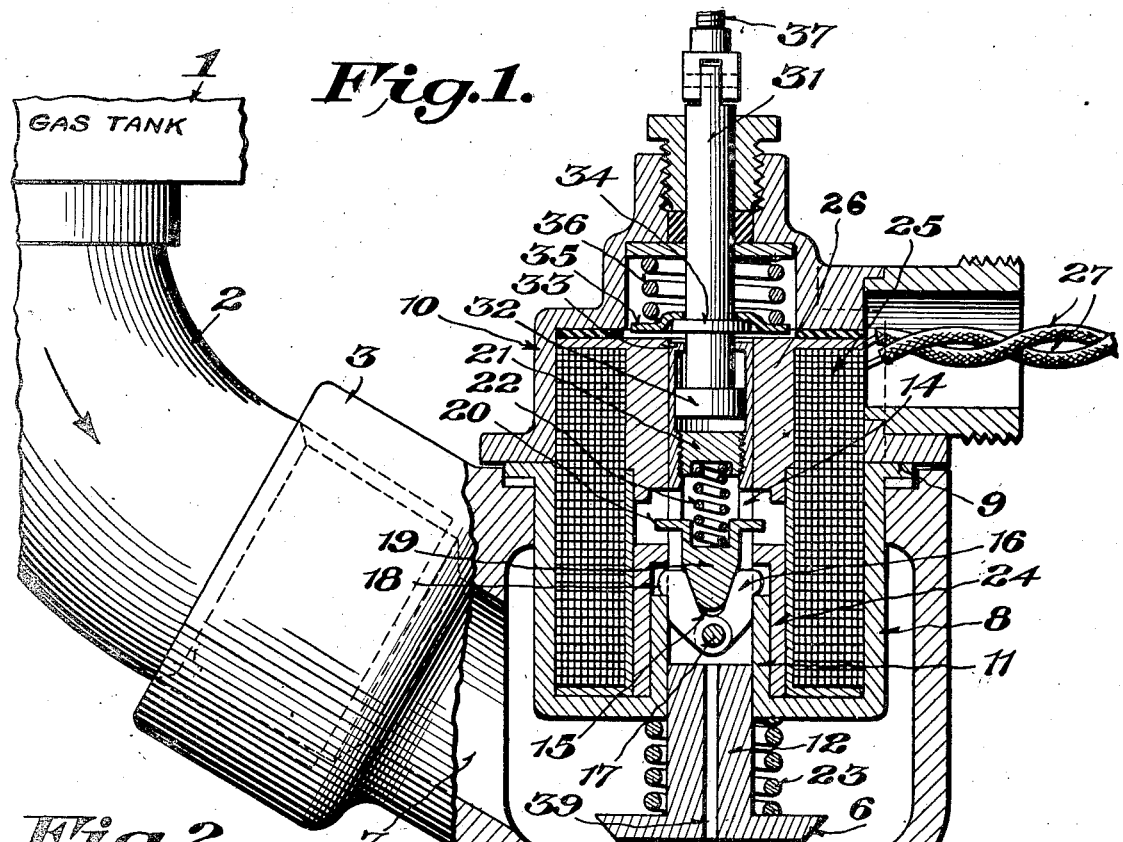
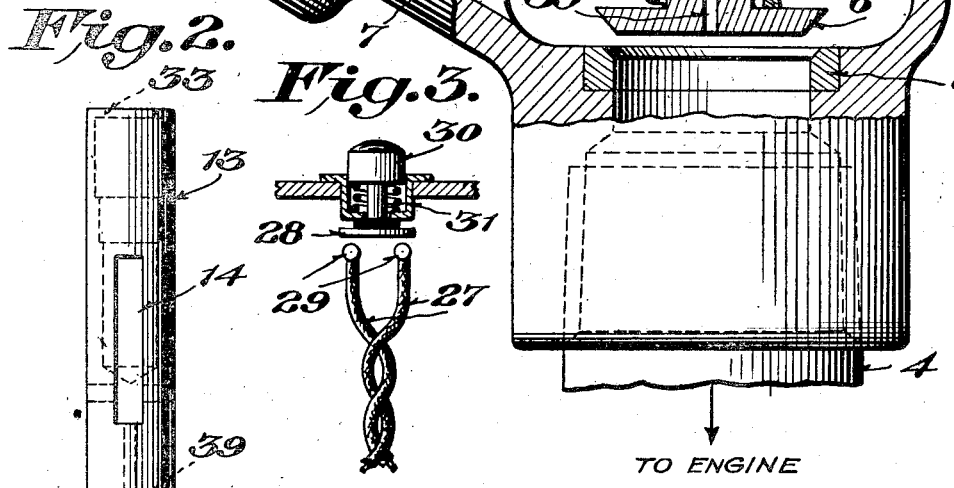
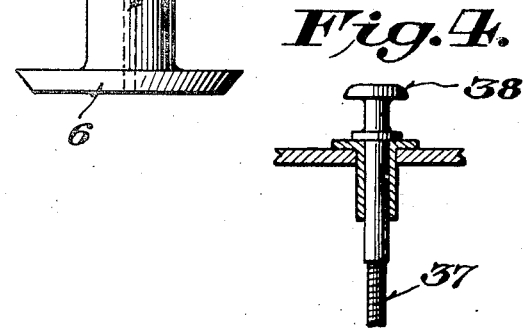

Patented Dec. 15, 1942

2,304,844

UNITED STATES PATENT OFFICE 2,304,844

FUEL CUTOFF VALVE AND OPERATING MECHANISM THEREFOR

Arthur L. Parker and Domenic A. Di Tirro, Cleveland, Ohio; said Di Tirro assignor to said Parker Application March 31, 1941, Serial No. 386,213

6 Claims. (Cl. 137—139)

The invention relates to new and useful improvements in a manually controlled valve-actuating mechanism for use in connection with a fuel supply system for aircraft.

An object of the invention is to provide a valve-actuating mechanism controlled from the instrument panel of the aircraft for closing a valve for cutting off the supply of fuel at the tank for emergency purposes.

A further object of the invention is to provide a valve-actuating mechanism of the above type wherein the valve is spring-closed and normally held open by a latching means which may be released from the instrument panel.

A still further object of the invention is to provide means operated from the instrument panel for opening and re-setting the valve so that it will be held open by the latching means.

These and other objects will in part be obvious and will in part be hereinafter more fully described.

In the drawing—

Figure 1 is a sectional view through the valve-actuating means embodying the invention;

Fig. 2 is a detail in side view showing the valve and valve stem;

Fig. 3 is a detail view in section showing more or less diagrammatically the control switch for the solenoid, which switch is located at the instrument panel of the aircraft, and Fig. 4 is a detail in section showing more or less diagrammatically a pull-button located at the instrument panel for opening the valve and re-setting the same.

A portion of a fuel supply tank is indicated at 1. Connected to this fuel supply tank in any suitable way is a pipe 2 which in turn is connected to a valve casing 3 located near the tank. This valve casing 3 has a pipe 4 connected thereto which supplies fuel to the engines. Said valve casing 3 is provided with a valve seat 5 with which a valve 6 is adapted to make contact and close the fluid passage 7 leading from the tank 1 to the pipe 4 which supplies fuel to the engines. When the valve is in engagement with the seat, then the fuel supply passage will be closed.

Mounted in the valve casing is a cup-shaped member 8 provided with a flange 9 at its upper end. The flange engages the sealing gasket at the upper end of the casing 3. A bonnet 10 is secured to the casing and holds the flange 9 in tight sealing engagement with the gasket. Any suitable means may be used for this purpose.

This cup-shaped member 8 is provided with an opening surrounded by a sleeve 11. The sleeve serves as a guide for a valve stem 12 carrying the valve 6. Said valve stem 12 as more fully shown in Figure 2, is bored so as to provide a chamber 13 therein. Slots 14 lead through the wall of the valve stem into the chamber 13. The slots extend slightly below the lower end of the chamber 13. Mounted in these slots are two latches 15 and 16. The latches are supported for independent swinging movement on the pivot pin 17 which is located in a suitable bore formed transversely through the valve stem. Each latch is provided with a shoulder 18. Mounted directly above the latches is a locking head 19. This locking head 19 has laterally projecting ears 20, 20 which extend out through the slots 14 in the valve stem. Threaded into the valve stem is an abutment block 21. A spring 22 bears against the abutment block at its upper end and against the locking head at its lower end. This forces the locking head downwardly between the latches and normally holds the latches forced outward over the ends of the sleeve 11.

There is a spring 23 which bears against the valve at its lower end and against the bottom of the cup 8 at its upper end. This spring normally urges the valve downward onto the seat 5. The latches, however, will hold the valve raised in the position shown in Figure 1 of the drawing. Surrounding the sleeve 11 and guided thereby is a metal sleeve 24 having the upper ends thereof extended inwardly so as to move close to the outer surface of the valve stem 12. When this metal sleeve 24 is raised, it will contact with the ears 20 and raise the locking head 19, compressing the spring 22, and this will release the latches so that the spring 23 will move the valve to closed position.

Located partly in the cup 8 and partly in the bonnet 10 is a solenoid 25. Associated with the solenoid is a core member 26. When this solenoid is energized, the core member 26 will be magnetized and this will attract the metal sleeve 24 and lift the same so as to release the locking head and permit the valve to close. The leads 27 from the solenoid are connected with a suitable source of electricity and to a manually controlled switch at the instrument panel.

In Figure 3 there is illustrated diagrammatically one form of switch that might be used for this purpose. The switch is of the plunger type and includes a bar 28 which is adapted to connect the terminals 29, 29, and thus establish a current through the solenoid. A button 30 carried by the bar 28 is spring-pressed outward by means of a spring 31, so that as soon as the button is released the switch will be moved to open position.

In case of fire or any other emergency, which makes it desirable to cut off the fuel supply at the tank, the button 30 is pressed upon which will close the circuit through the solenoid 25. When the solenoid is energized, the core 26 will be magnetized and lift the metal sleeve 24, thus releasing the latches and the valve will be closed by the action of the spring 23. Assuming that the operator releases the button so that the current through the solenoid is broken, this will not lift the valve off its seat, for the reason that the latches have moved away from the holding shoulders therefor, and moved with the valve, and therefore, they will not function to hold the valve raised until it is lifted to a re-set position.

Manually controlled means is provided for opening the valve and latching the same in open position, when it is desired to again connect the fuel system to the supply tank. Extending down through the bonnet 10 is a bar 31. This bar extends into the chamber 13 formed in the stem of the valve. Said bar has a head 32 thereon which will engage inwardly extending portions 33 at the upper end of the valve stem. The valve stem carries a cross bar 34. A washer 35 is contacted with by a spring 36 and this spring normally moves the bar 31 inward so that the head 32 is well away from the inwardly extending portions 33. The bar 31 will not interfere with the closing of the valve when the latches are released. This bar 31 is connected to a Bowden wire 37 which in turn is connected to a pull-button 38 at the instrument panel, as shown diagrammatically in Figure 4. When the bar is lifted by the pull-button 38, then the head 32 will contact with the inwardly extending portions 33 and lift the valve stem, which will move the valve away from its seat. The locking head 19 is cam-shaped at the sides thereof and is continuously spring-pressed against the latches. As soon as the latches reach a point above the upper end of the sleeve 11, they will be forced outward into holding engagement with said sleeve, and this latches the valve in its raised position and constitutes a re-setting of the valve.

It is obvious that many changes may be made in the details of construction without departing from the spirit of the invention as set forth in the appended claims.

Having thus described the invention, what we claim as new and desire to secure by Letters Patent, is:

1. A cut-off valve mechanism for a fuel supply system comprising a valve casing having a fluid passage therethrough, a valve for closing said passage, spring means for closing the valve, latches for normally holding the valve open, a holding member engaging the latches for positively locking the same in holding position, a solenoid associated with the valve casing, and means actuated thereby when energized for lifting said holding member to release the latches.

2. A cut-off valve mechanism for a fuel supply system comprising a valve casing having a fluid passage therethrough, a valve for closing said passage, spring means for closing the valve, latches for normally holding the valve open, a holding member engaging the latches for positively locking the same in holding position, a solenoid associated with the valve casing, means actuated thereby when energized for lifting said holding member to release the latches and manual means for lifting the valve to open position, said holding member being yieldingly actuated and operating to move the latches into holding position when the valve is raised to open position.

3. A cut-off valve mechanism for a fuel supply system comprising a valve casing having a fluid passage therethrough, a valve for closing said passage, spring means for closing said valve, said valve having a valve stem, said valve casing having a sleeve for guiding said valve stem in its movements, latches pivoted to the valve stem and adapted to engage the upper end of the sleeve for holding said valve in raised position, a yieldingly actuated locking head for forcing the latches into holding engagement with said sleeve, and a manually initiated means for raising said locking head for releasing the latches.

4. A cut-off valve mechanism for a fuel supply system comprising a valve casing having a fluid passage therethrough, a valve for closing said passage, spring means for closing said valve, said valve having a valve stem, said valve casing having a sleeve for guiding said valve stem in its movements, latches pivoted to the valve stem and adapted to engage the upper end of the sleeve for holding said valve in raised position, a yieldingly actuated locking head for forcing the latches into holding engagement with said sleeve, a solenoid surrounding the valve stem, and a member moved lengthwise of the valve stem when the solenoid is energized for contacting with said locking head for lifting the same and releasing the latches to permit the valve to close.

5. A cut-off valve mechanism for a fuel supply system comprising a valve casing having a fluid passage therethrough, a valve for closing said passage, spring means for closing said valve, said valve having a valve stem, said valve casing having a sleeve for guiding said valve stem in its movements, latches pivoted to the valve stem and adapted to engage the upper end of the sleeve for holding said valve in raised position, a yieldingly actuated locking head for forcing the latches into holding engagement with said sleeve, a solenoid surrounding the valve stem, a member moved lengthwise of the valve stem when the solenoid is energized for contacting with said locking head for lifting the same and releasing the latches to permit the valve to close, and a manually operated bar adapted to be moved into engagement with the valve stem for raising the same to permit the latches to move into holding position.

6. A cut-off valve mechanism for a fuel supply system comprising a valve casing having a fluid passage therethrough, a valve for closing said passage, spring means for closing said valve, said valve having a valve stem, said valve casing having a sleeve for guiding said valve stem in its movements, latches pivoted to the valve stem and adapted to engage the upper end of the sleeve for holding said valve in raised position, a yieldingly actuated locking head for forcing the latches into holding engagement with said sleeve, a solenoid surrounding the valve stem, a member moved lengthwise of the valve stem when the solenoid is energized for contacting with said locking head for lifting the same and releasing the latches to permit the valve to close, a manually operated bar adapted to be moved into engagement with the valve stem for raising the same to permit the latches to move into holding position, and spring means for moving said bar from lifting engagement with the valve stem so as to permit the free closing of the valve when the latching means is released.

ARTHUR L. PARKER.
DOMENIC A. DI TIRRO.